US006504165B1

(12) United States Patent
Furutoh

(10) Patent No.: US 6,504,165 B1
(45) Date of Patent: Jan. 7, 2003

(54) LIGHT-SHIELDING MECHANISM FOR SHEET-LIKE MEMBER PROCESSING APPARATUS

(75) Inventor: Takashi Furutoh, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/559,467

(22) Filed: Apr. 26, 2000

(30) Foreign Application Priority Data

Apr. 26, 1999 (JP) ............................................. 11-118694

(51) Int. Cl.⁷ ............................... G21F 1/00; G02B 6/44
(52) U.S. Cl. ................................ 250/515.1; 250/505.1; 399/66
(58) Field of Search ......................... 250/505.1, 515.1, 250/519.1; 399/57, 66, 67

(56) References Cited

U.S. PATENT DOCUMENTS 4,619,513 A * 10/1986 Yamana et al. ................. 355/3
6,289,184 B1 * 9/2001 Yoo et al. ...................... 399/57
6,300,646 B1 * 10/2001 Otsuka ......................... 250/589

* cited by examiner

*Primary Examiner*—John R. Lee
*Assistant Examiner*—David A. Vanore
(74) *Attorney, Agent, or Firm*—Sughrue Mion, PLLC

(57) ABSTRACT

A light-shielding mechanism has first through fourth discharge-eliminating mechanisms disposed on a feed path for a sheet-like member for eliminating electric charges from the sheet-like member in contact therewith. The first through fourth charge-eliminating brushes comprise bristle assemblies whose bristles are set at a density ranging from 3,000 to 5,000 bristles/inch and have a thickness ranging from 10 denier to 300 denier. The bristle assemblies 68a–68d have an effective light-shielding function. The light-shielding mechanism is simple in construction and inexpensive to manufacture.

8 Claims, 5 Drawing Sheets

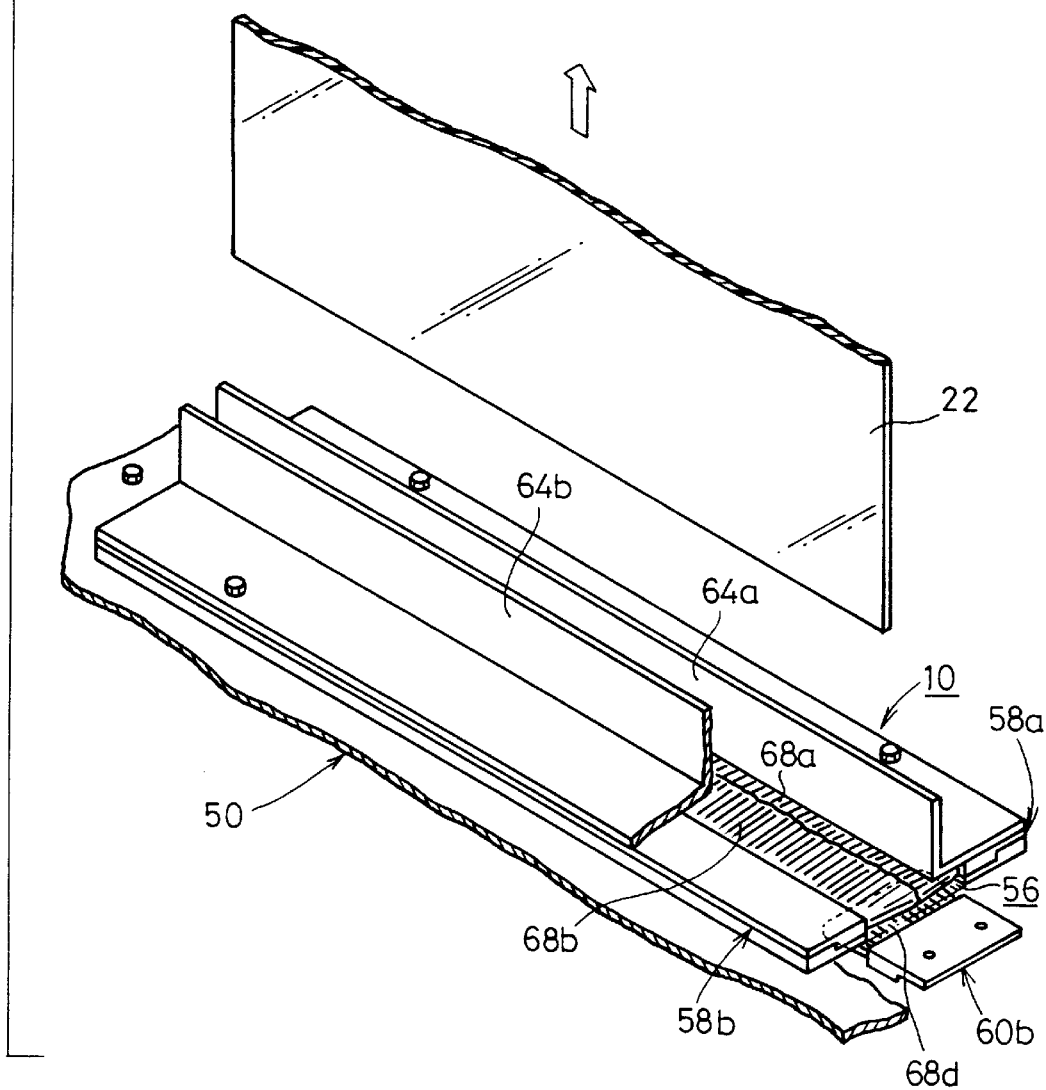

LIGHT-SHIELDING MECHANISM FOR SHEET-LIKE MEMBER PROCESSING APPARATUS

BACKGROUND OF THE INVENTION

1. Field of the Invention

The present invention relates to a light-shielding mechanism for preventing a sheet-like member from being irradiated with unwanted extraneous light while the sheet-like member is being fed and processed in a sheet-like member processing apparatus.

2. Description of the Related Art

There is known a system for recording radiation image information of a subject such as a human body with a stimulable phosphor, and reproducing the recorded radiation image information on a photosensitive medium such as a photographic film, or displaying the recorded radiation image information on a display device such as a CRT or the like.

When a radiation energy such as X-rays, α-rays, γ-rays, electron beams, ultraviolet radiation, or the like is applied to a certain phosphor, it stores part of the applied radiation energy. When stimulating light such as visible light is subsequently applied to the phosphor, the phosphor emits light depending the stored radiation energy. Such a phosphor is referred to as a stimulable phosphor. A stimulable phosphor is usually used in the form of a sheet which is referred to as a stimulable phosphor sheet (sheet-like member).

The above known system includes an image information reading apparatus (sheet-like member processing apparatus) which comprises a reading unit (scanning unit) for reading image information recorded on a stimulable phosphor sheet, and an erasing unit for erasing remaining image information from the stimulable phosphor sheet after the recorded image information has been read. In the image information reading apparatus, a cassette housing a stimulable phosphor sheet which bears radiation image information of a subject recorded by an external exposure device is inserted into a loading unit, or a plurality of such cassettes are inserted into respective loading units.

Thereafter, the lid of the cassette is opened, and then the stimulable phosphor sheet is taken out of the cassette by a sheet feeding mechanism. The stimulable phosphor sheet is delivered to the reading unit by a sheet delivering mechanism. In the reading unit, the recorded image information is read from the stimulable phosphor sheet, and then remaining image information is erased from the stimulable phosphor sheet in the erasing unit, after which the stimulable phosphor sheet is placed into the cassette which has been disposed in the loading unit.

The above system also includes an image information reproducing apparatus (sheet-like member processing apparatus) for reproducing radiation image information on a photographic photosensitive medium such as a photographic film or the like. In the image information reproducing apparatus, a magazine contains a plurality of photographic photosensitive mediums, and one of the photographic photosensitive mediums at a time is removed from the magazine and delivered by a suction mechanism to a sheet feeding mechanism (sheet feeder), which feeds the photographic photosensitive medium to a recording unit (scanning unit). In the recording unit, the radiation image information obtained from the stimulable phosphor sheet is recorded on the photographic photosensitive medium by the application of a laser beam or the like.

In the image information reading apparatus and the image information reproducing apparatus, in order to allow the reading unit and the recording unit to read and record high-quality images highly accurately, the stimulable phosphor sheet and the photographic film (hereinafter collectively referred to as a "sheet-like member") fed in the apparatus need to be reliably shielded from unwanted light (extraneous light).

It has been customary to employ full-width rubber rollers having an axial length equal to or greater than the width of sheet-like members and a labyrinth structure for shielding the feed path from extraneous light in the apparatus. However, the conventional light-shielding arrangements are expensive to manufacture and complex in structure, making the apparatus considerably large in size.

SUMMARY OF THE INVENTION

It is a primary object of the present invention to provide a light-shielding mechanism of simple and inexpensive structure for shielding a sheet-like member from unwanted extraneous light in a sheet-like member processing apparatus.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a fragmentary perspective view showing the manner in which remaining radiation information is erased from the stimulable phosphor sheet in the erasing unit.

DESCRIPTION OF THE PREFERRED EMBODIMENTS

Figure 1:
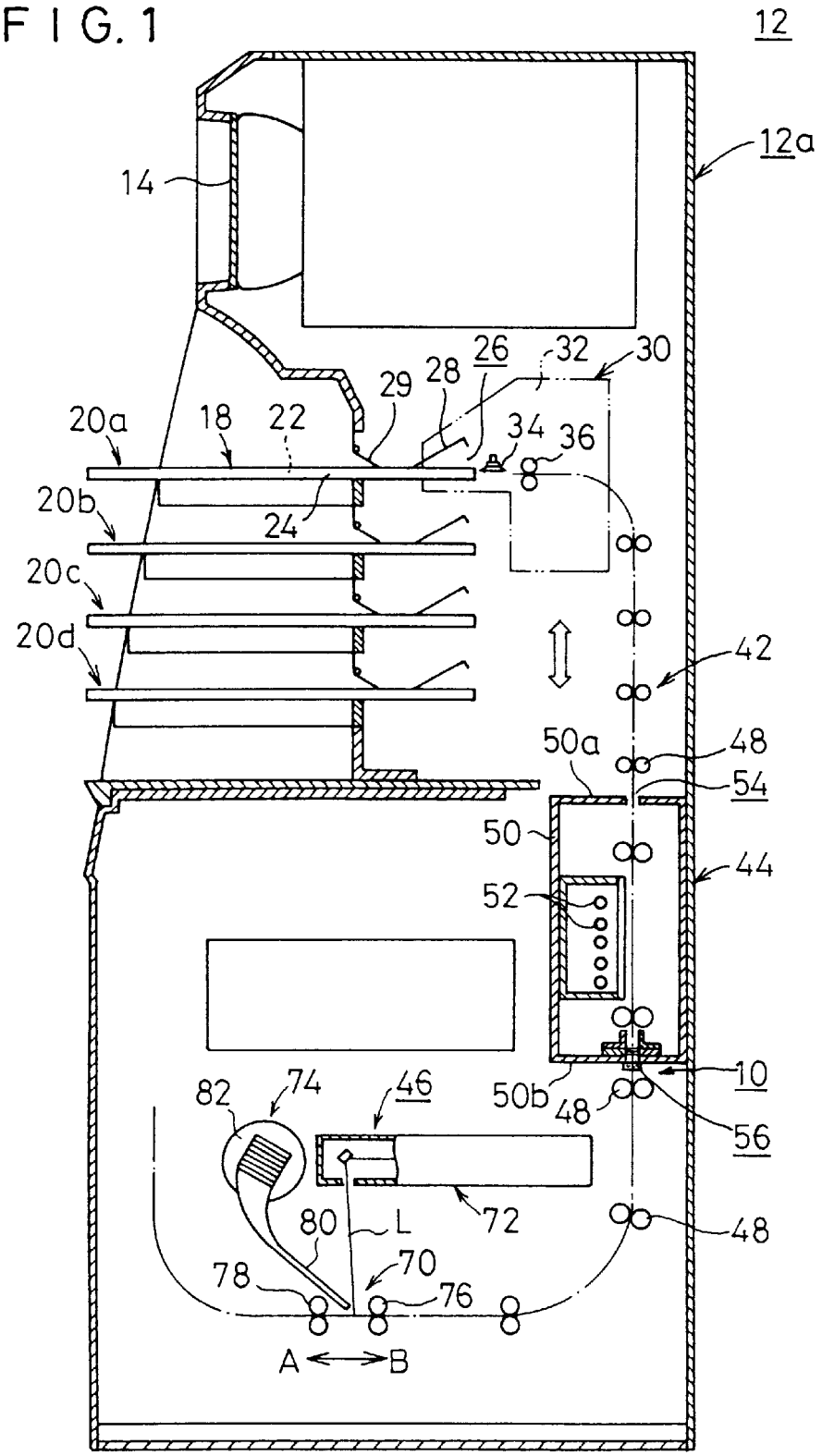
FIG. 1 is a schematic vertical cross-sectional view of an image information reading apparatus which incorporates a light-shielding mechanism according to the present invention.
Figure 2:
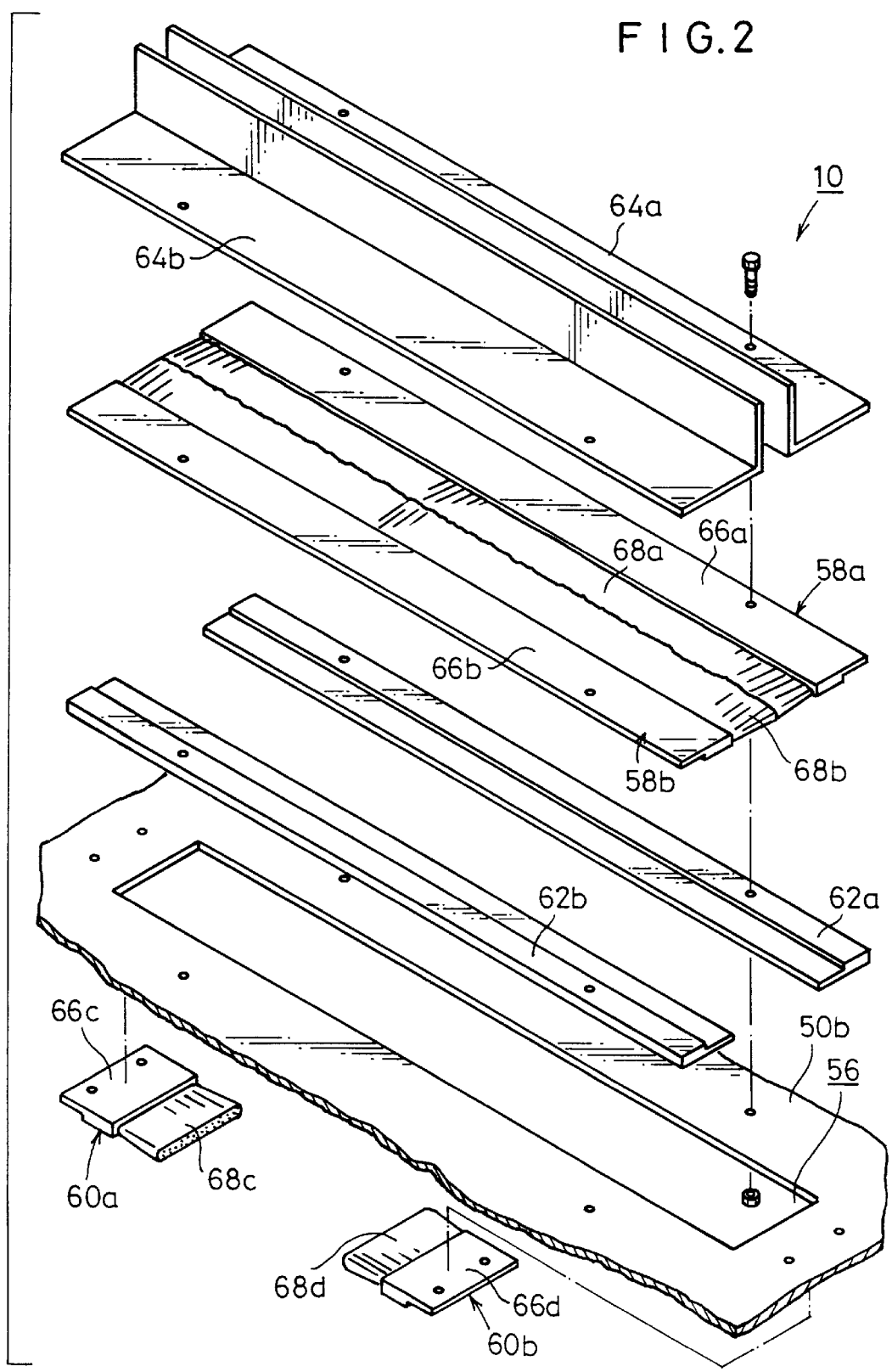
FIG. 2 is an exploded perspective view of the light-shielding mechanism.
Figure 3:
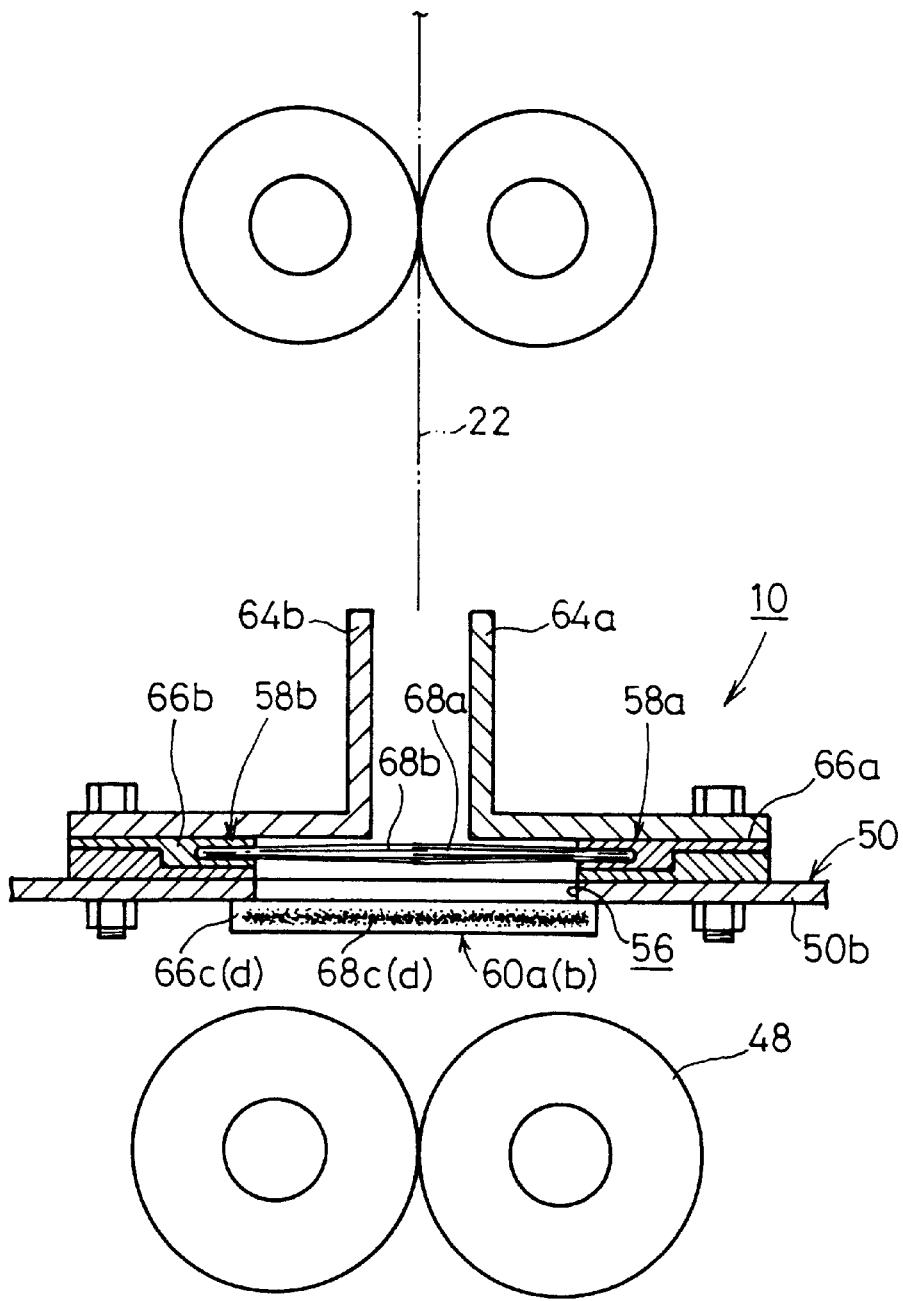
FIG. 3 is a transverse cross-sectional view of the light-shielding mechanism.

FIG. 1 shows in schematic vertical cross section an image information reading apparatus (sheet-like member processing apparatus) 12 which incorporates a light-shielding mechanism 10 according to the present invention.

As shown in FIG. 1, the image information reading apparatus 12 has an apparatus housing 12a including a front wall (control wall) which supports on its upper portion a touch panel 14 that functions as controls and a display monitor. The apparatus housing 12a accommodates therein a plurality of, e.g., four, cassette loading regions 20a through 20d for removably holding respective cassettes 18, disposed below the touch panel 14.

Each of the cassettes 18 comprises a casing 24 for housing a stimulable phosphor sheet (sheet-like member) 22, and a lid 28 by which an opening 26 in the casing 24 is openably closed. The cassette 18 has a lock means (not shown) for locking the lid 28 in a closed position on the casing 24.

A vertically movable sheet feeder 30 is vertically movably disposed behind the cassette loading units 20a through 20d. The vertically movable sheet feeder 30 can selectively be aligned with any one of the cassette loading units 20a through 20d for removing a stimulable phosphor sheet 22 from the cassette 18 in the corresponding one of the cassette loading units 20a through 20d and returning a stimulable phosphor sheet 22 from which radiation image information is read and erased back into the cassette 18. The vertically movable sheet feeder 30 has a vertically. movable base 32 on which there are mounted a suction cup 34 movable into the cassette 18 with the lid 28 being open in one of the cassette loading units 20a through 20d, and a feed roller pair 36 for receiving and feeding the stimulable phosphor sheet 22 attracted by the suction cup 34.

The image information reading apparatus 12 has an erasing unit 44 and a reading unit 46 disposed below the vertically movable sheet feeder 30 in the apparatus housing 12a and connected thereto by a feed system 42. The feed system 42 comprises a plurality of roller pairs 48 which jointly make up a vertical feed path extending downwardly from the vertically movable sheet feeder 30. The erasing unit 44 is disposed on the vertical feed path.

The erasing unit 44 has a casing 50 which houses a vertical array of erasing light sources 52. The casing 50 includes an upper panel 50a having a first opening (inlet and outlet) 54 defined therein for guiding the stimulable phosphor sheet 22 into and out of the casing 50 therethrough, and a lower panel 50b having a second opening (outlet and inlet) 56 defined therein for guiding the stimulable phosphor sheet 22 out of and into the casing 50 therethrough. Each of the first and second openings 54, 56 is of an elongate rectangular shape. The light-shielding mechanism 10 according to the present invention is associated with the second opening 56.

As shown in FIGS. 2 through 5, the light-shielding mechanism 10 has charge-eliminating brushes disposed on a feed path for the stimulable phosphor sheet 22 for contacting and eliminating electric charges from the stimulable phosphor sheet 22. In the illustrated embodiment, the charge-eliminating brushes include first and second charge-eliminating brushes 58a, 58b, and third and fourth charge-eliminating brushes 60a, 60b. The first and second charge-eliminating brushes 58a, 58b are disposed one on each side of the second opening 56, i.e., one on each side of the stimulable phosphor sheet 22, and mounted on an inner (upper) surface of the lower panel 50b by respective attachment plates 62a, 62b disposed therebetween. First and second guide plates 64a, 64b are fixed respectively to upper surfaces of the first and second charge-eliminating brushes 58a, 58b. The third and fourth charge-eliminating brushes 60a, 60b are disposed one on each end of the second opening 56, i.e., one on each edge of the stimulable phosphor sheet 22, and mounted on an outer (lower) surface of the lower panel 50b. The third and fourth charge-eliminating brushes 60a, 60b are oriented in directions perpendicular to the first and second charge-eliminating brushes 58a, 58b.

The first and second charge-eliminating brushes 58a, 58b comprise respective plates 66a, 66b disposed one on each side of the stimulable phosphor sheet 22, i.e., the second opening 56, and longer than the transverse dimension of the stimulable phosphor sheet 22 in the transverse direction thereof which is perpendicular to the direction in which the stimulable phosphor sheet 22 is fed, and respective bristle assemblies 68a, 68b having ends embedded in the respective plates 66a, 66b and projecting toward each other. The bristle assemblies 68a, 68b comprise bristles set at a density ranging from 3,000 to 5,000 bristles/inch, preferably from 3,500 to 4,400 bristles/inch, and having a thickness ranging from 10 D (denier) to 300 D, preferably from 50 D to 200 D. The density of the bristles is about 2.5 times the density of the bristles of general charge-eliminating brushes. The bristles may be made of any of various materials, particularly a material that is not detrimental to the stimulable phosphor sheet 22 upon contact therewith, e.g., composite fibers of acrylonitrile and copper sulfide.

The third and fourth charge-eliminating brushes 60a, 60b are of the same structure as the first and second charge-eliminating brushes 58a, 58b. Those parts of the third and fourth charge-eliminating brushes 60a, 60b which are identical to those of the first and second charge-eliminating brushes 58a, 58b are denoted by identical reference numerals with suffixes c, d.

As shown in FIG. 1, the reading unit 46 is disposed near the lower end of the erasing unit 44. The reading unit 46 comprises an auxiliary scanning feeding mechanism 70 for delivering a stimulable phosphor sheet 22 from a cassette 18 in an auxiliary scanning direction indicated by the arrow A, an optical system 72 for applying a laser beam L as it is deflected in a main scanning direction (substantially perpendicular to the auxiliary scanning direction) to the stimulable phosphor sheet 22 as it is delivered in the auxiliary canning direction, and a light guiding system 74 for photoelectrically reading light which is emitted from the stimulable phosphor sheet 22 when the stimulable phosphor sheet 22 is exposed to the laser beam L.

The auxiliary scanning feeding mechanism 70 has first and second roller pairs 76, 78 rotatable in synchronism with each other. Each of the first and second roller pairs 76, 78 has a pair of rollers that can be moved toward and away from each other. The light guiding system 74 comprises a light guide 80 extending along a main scanning line on the stimulable phosphor sheet 22 where the laser beam L is applied, and a photomultiplier 82 mounted on an upper end of the light guide 80.

Operation of the image information reading apparatus 12 thus constructed will be described below.

A cassette 18 which stores a stimulable phosphor sheet 22 which carries radiation image information of a subject such as a human body recorded by an exposure device (not shown) is introduced into the apparatus housing 12a along the cassette loading region 20a, for example. As the cassette 18 is introduced, the leading end of the cassette 18 pushes open a shutter 29, and enters the interior space of the apparatus housing 12a.

After respective cassettes 18 have been inserted into the cassette loading units 20a through 20d, the vertically movable sheet feeder 30 is actuated to move the vertically movable base 32 into horizontal alignment with the cassette loading unit 20a, for example. Then, the first stimulable phosphor sheet 22 in the cassette 18 is attracted by the suction cup 34, and removed thereby from the cassette 13 out of the opening 26. Substantially at the same time that the leading end of the stimulable phosphor sheet 22 is gripped by the feed roller pair 36, the stimulable phosphor sheet 22 is released from the suction cup 34. The stimulable phosphor sheet 22 is transferred from the feed roller pair 36 to the feed system 42, and then delivered downwardly to the erasing unit 44 by the roller pairs 48 of the feed system 42.

Figure 4:
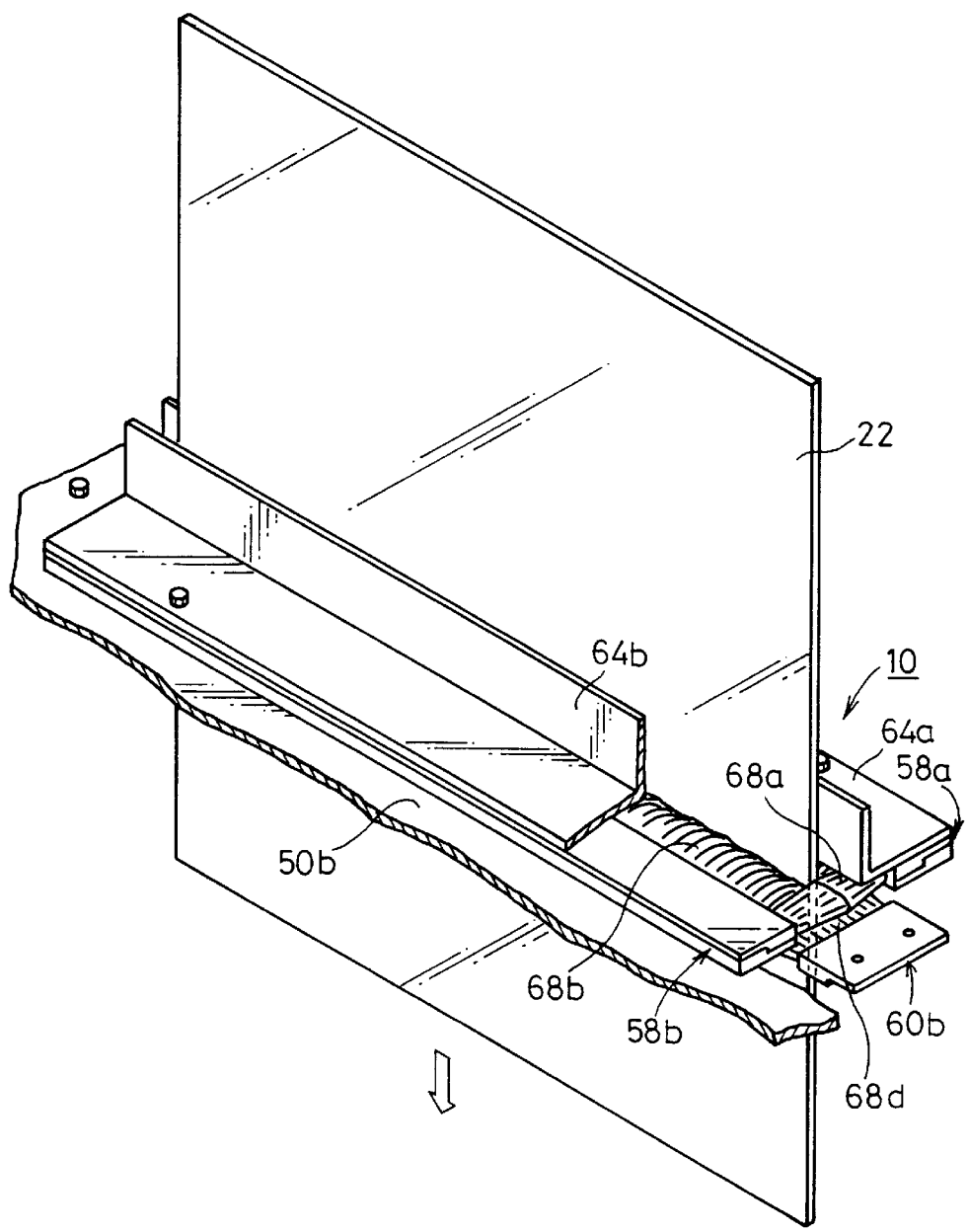
FIG. 4 is a fragmentary perspective view showing the manner in which a stimulable phosphor sheet passes through an erasing unit which includes the light-shielding mechanism.

In the erasing unit 44, the stimulable phosphor sheet 22 is introduced into the casing 50 through the first opening 54. When the stimulable phosphor sheet 22 is thereafter fed out of the casing 50 through the second opening 56, both surfaces of the stimulable phosphor sheet 22 are held in contact with the first and second charge-eliminating brushes 58a, 58b, and both edges of the stimulable phosphor sheet 22 are held in contact with the third and fourth charge-eliminating brushes 60a, 60b, as shown in FIG. 4. Therefore, electric charges in the stimulable phosphor sheet 22 are effectively eliminated by the first and second charge-eliminating brushes 58a, 58b and the third and fourth charge-eliminating brushes 60a, 60b. Subsequently, the stimulable phosphor sheet 22 is fed to the reading unit 46 by the feed system 42.

In the reading unit 46, as shown in FIG. 1, while the stimulable phosphor sheet 22 is being fed in the auxiliary scanning direction indicated by the arrow A by the first and second roller pairs 76, 78 of the auxiliary scanning feeding mechanism 70, the laser beam L emitted from the optical system 72 is applied to the recording surface of the stimulable phosphor sheet 22. Radiation image information stored in the stimulable phosphor sheet 22 is now photoelectrically read by the light guiding system 74.

The stimulable phosphor sheet 22 from which the radiation image information has been read by the reading unit 46 is fed back upwardly into the erasing unit 44 by the feed system 42. The leading end of the stimulable phosphor sheet 22 which is fed upwardly is introduced into the casing 50 while being held in contact with the first and second charge-eliminating brushes 58a, 58b and the third and fourth charge-eliminating brushes 60a, 60b of the light-shielding mechanism 10 at the second opening 56. The erasing light sources 52 of the erasing unit 44 are energized to erase remaining radiation image information from the stimulable phosphor sheet 22.

In the illustrated embodiment, the bristles of the bristle assemblies 68a–68d of the first through fourth charge-eliminating brushes 58a, 58b, 60a, 60b are set at a density ranging from 3,000 to 5,000 bristles/inch, preferably from 3,500 to 4,400 bristles/inch, and have a thickness ranging from 10 D to 300 D, preferably from 50 D to 200 D. When the trailing end of the stimulable phosphor sheet 22 moves off the bristle assemblies 68a–68d into the casing 50, the second opening 56 is blocked against entry of light by the bristle assemblies 68a–68d, as shown in FIG. 5.

When the erasing light sources 52 are energized in the casing 50, erasing light emitted from the erasing light sources 52 is reliably prevented from leaking from the second opening 56 along the feed system 42 to the reading unit 46. The light-shielding mechanism 10 is much simpler than the conventional light-shielding structures such as a laby-rinth structure, can effectively be reduced in size, and can be manufactured highly inexpensively.

The light-shielding mechanism 10 is mainly composed of the first through fourth charge-eliminating brushes 58a, 58b, 60a, 60b whose bristles have a density that is about 2.5 times the density of the bristles of general charge-eliminating brushes. The light-shielding mechanism 10 can thus perform a charge-eliminating function and a light-shielding function with a highly simple arrangement. As described above, the bristles of the bristle assemblies 68a–68d of the first through fourth charge-eliminating brushes 58a, 58b, 60a, 60b are set at a density ranging from 3,000 to 5,000 bristles/inch, preferably from 3,500 to 4,400 bristles/inch, and have a thickness ranging from 10 D to 300 D, preferably from 50 D to 200 D. The bristles may be made of composite fibers of acrylonitrile and copper sulfide. Consequently, the light-shielding mechanism 10 has a sufficient light-shielding effect, and is not detrimental to the stimulable phosphor sheet 22, allowing the stimulable phosphor sheet 22 to be used efficiently. If the diameters of the bristles of the bristle assemblies 68a–68d were larger, then they would tend to be detrimental to the stimulable phosphor sheet 22. If the diameters of the bristles of the bristle assemblies 68a–68d were smaller, then they would be liable to be broken or otherwise damaged due to a reduced mechanical strength.

The stimulable phosphor sheet 22 from which remaining radiation image information has been erased is delivered up-wardly from the erasing unit 44 by the feed system 42, and thereafter sent back into the empty cassette 18 in the cassette loading unit 20a by the vertically movable sheet feeder 30.

In the illustrated embodiment, the light-shielding mechanism 10 is associated with the second opening 56 in the casing 50 of the erasing unit 44. However, another light-shielding mechanism 10 may also be associated with the first opening 54. Moreover, still another light-shielding mechanism 10 may be incorporated in an area on the feed path for the stimulable phosphor sheet 22 where unwanted light, e.g., extraneous light, would otherwise be likely to be applied to the stimulable phosphor sheet 22.

In the illustrated embodiment, the light-shielding mechanism 10 is incorporated in the image information reading apparatus 12 which reads radiation image information from the stimulable phosphor sheet 22 and erases remaining radiation image information from the stimulable phosphor sheet 22. However, the light-shielding mechanism 10 may be incorporated in an image information reproducing apparatus for reproducing radiation image information on a photo-graphic photosensitive medium such as a photographic film or the like.

In the light-shielding mechanism for use in the sheet-like member processing apparatus, the discharge-eliminating brushes are disposed on the feed path for the sheet-like member, and the bristles of the discharge-eliminating brushes are set at a density ranging from 3,000 to 5,000 bristles/inch, and have a thickness ranging from 10 denier to 300 denier. The discharge-eliminating brushes thus constructed have an effective light-shielding capability. The light-shielding mechanism is simple in construction and inexpensive to manufacture, and is capable of reliably preventing the sheet-like member from being irradiated with unwanted light.

Although a certain preferred embodiment of the present invention has been shown and described in detail, it should be understood that various changes and modifications may be made therein without departing from the scope of the appended claims.

What is claimed is:

1. A light-shielding mechanism for preventing a sheet-like member from being irradiated with unwanted light while the sheet-like member is being fed and processed in a sheet-like member processing apparatus, comprising:
a charge-eliminating brush disposed on a feed path for the sheet-like member for eliminating electric charges from the sheet-like member in contact therewith;
said charge-eliminating brush comprising bristles set at a density ranging from 3,000 to 5,000 bristles/inch and having a thickness ranging from 10 denier to 300 denier.

2. A light-shielding mechanism according to claim 1, wherein said charge-eliminating brush comprises a first charge-eliminating brush and a second charge-eliminating brush which are disposed on said feed path in confronting relationship to each other and one on each side of said sheet-like member in a transverse direction thereof.

3. A light-shielding mechanism according to claim 2, wherein said charge-eliminating brush comprises a third charge-eliminating brush and a fourth charge-eliminating brush which are disposed on said feed path in confronting relationship to each other and one on each edge of said sheet-like member.

4. A light-shielding mechanism according to claim 1, wherein said charge-eliminating brush comprise bristles set at a density ranging from 3,500 to 4,400 bristles/inch and having a thickness ranging from 50 denier to 200 denier.

5. A light-shielding mechanism according to claim 4, wherein said charge-eliminating brush comprises a first charge-eliminating brush and a second charge-eliminating brush which are disposed on said feed path in confronting to relationship to each other and one on each side of said sheet-like member in a transverse direction thereof.

6. A light-shielding mechanism according to claim 5, wherein said charge-eliminating brush comprises a third charge-eliminating brush and a fourth charge-eliminating brush which are disposed on said feed path in confronting relationship to each other and one on each edge of said sheet-like member.

7. A light-shielding mechanism according to claim 1, wherein said sheet-like member comprises a stimulable phosphor sheet, said sheet-like member processing apparatus having an erasing unit for erasing remaining radiation information from said stimulable phosphor sheet, said erasing unit having a casing with an inlet defined therein, said charge-eliminating brush being mounted on said inlet.

8. A light-shielding mechanism according to claim 1, wherein said sheet-like member comprises a stimulable phosphor sheet, said sheet-like member processing apparatus having an erasing unit for erasing remaining radiation information from said stimulable phosphor sheet, said erasing unit having a casing with an outlet defined therein, said charge-eliminating brush being mounted on said outlet.

* * * * *